(12) United States Patent
Lomb et al.

(10) Patent No.: US 6,185,042 B1
(45) Date of Patent: Feb. 6, 2001

(54) PROCESS FOR INCREASING THE CLARITY AND LEGIBILITY OF GRAPHICS, TEXT, AND CONTINUOUS TONE COMPOSITES IN LENTICULAR IMAGES

(75) Inventors: Kathryn Boddie Lomb; Carl D. Teger, both of Rochester; Roger Roy Adams Morton, Penfield, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/103,154

(22) Filed: Jun. 22, 1998

(51) Int. Cl.[7] .................................................. G02B 27/10
(52) U.S. Cl. .................................................. 359/619
(58) Field of Search .................... 359/619, 625, 359/626

(56) References Cited

U.S. PATENT DOCUMENTS

| | | |
|---|---|---|
| 4,814,826 | 3/1989 | Fritsch . |
| 4,920,039 | 4/1990 | Fotland et al. . |
| 4,959,641 * | 9/1990 | Bass et al. ........................... 340/700 |
| 5,161,979 | 11/1992 | Sekiguchi . |
| 5,276,478 | 1/1994 | Morton . |
| 5,278,608 | 1/1994 | Taylor et al. . |
| 5,479,270 | 12/1995 | Taylor . |
| 5,488,451 * | 1/1996 | Goggins ................................. 355/77 |
| 5,581,402 | 12/1996 | Taylor . |
| 5,673,100 | 9/1997 | Morton . |
| 5,695,346 * | 12/1997 | Sekiguchi et al. ................... 434/365 |
| 5,697,006 | 12/1997 | Taguchi et al. . |
| 5,896,230 * | 4/1999 | Goggins ................................. 359/619 |
| 5,924,870 * | 7/1999 | Brosh et al. ......................... 434/365 |

* cited by examiner

Primary Examiner—Ricky Mack
(74) Attorney, Agent, or Firm—William F. Noval (57) ABSTRACT

System and method forms a lenticular viewing card having viewable depth or motion images by processing an original image into digital form and sampling and shifting the processed original image into at least two frames of images shifted perpendicular to the lenticular direction from each other by being sampled at different points. These frames of images are sliced and interlaced into a merged image that is printed and positioning into a viewing position with a lenticular lens sheet to permit a sequential viewing of the frames making up the merged image as a function of a user's viewing angle.

12 Claims, 7 Drawing Sheets

| | |
|---|---|
| VIEW 1 | xxx |
| VIEW 2 | \| |
| VIEW 3 | ┆ |
| VIEW 4 | ⋮ |

PRIOR ART

PROCESS FOR INCREASING THE CLARITY AND LEGIBILITY OF GRAPHICS, TEXT, AND CONTINUOUS TONE COMPOSITES IN LENTICULAR IMAGES

FIELD OF THE INVENTION

The invention relates generally to the field of lenticular imaging, and in particular to the creation of depth imagery (vertically orientated lenticular screens) and images with motion (horizontally orientated lenticular screens). More specifically, to a process for improving the clarity of view of elements forming the images.

BACKGROUND OF THE INVENTION

The history of lenticular imaging dates back to the early 1900's when Gabrielle Lipmann developed a process of integral photography, that when combined with a fisheye lens, offered a three-dimensional image to an observer. In 1925, J. S. Curwen patented a device (U.S. Pat. No. 1,475,430) involving two distinct images which changed from one to another, dependent upon the viewing angle presented to an observer.

While technology has advanced, the principal process remains similar. A lenticular image is comprised of a sequence of images that are interlaced to form a singular image where each individual image (or frame) is viewable at a different angle to the viewer when viewed through a lenticular lens sheet. These various images are termed views.

The current method of displaying an image, or portion thereof, which does not appear to change across a number of views; or throughout a depth or motion sequence, or a portion thereof, is accomplished by means of fixing the constant image to a constant coordinate location relative to the image area of each frame within the sequence from which the lenticular image is to be created. Fixing the image information in a constant location has always been assumed to provide the clearest and sharpest view of a stationary image The conventional method, described above, displays the shortcomings of a lenticular imaging system, exhibiting a cutoff of detail where lenticule spacing exists, and a condensing of image information resulting in decreased clarity and legibility.

SUMMARY OF THE INVENTION

The present invention is directed to overcoming one or more of the problems set forth above. Briefly summarized, according to one aspect of the present invention, a unique method forms a lenticular image having either a viewable depth or a motion effect. The image is comprised of at least two frames of similar image source content where one or more images are sequentially displaced perpendicular to the lenticular direction; whereby the final image translation occurs at different portions of the source image.

Specifically there is provided a method for forming a lenticular image having viewable depth or motion effects, comprising the steps of:
a) interlacing at least two frames of similar image content with at least one frame sequentially displaced perpendicular to the lenticules; and
b) positioning a sheet of lenticular lenses so as to view the image content of the interlaced frames of similar image content.

Additionally, there is provided a system for forming a lenticular viewing card having viewable depth or motion images, comprising:

means for receiving and processing an original image in digital form;

means for sampling and shifting the processed original image from said receiving means into at least two frames of images shifted from each other by being sampled at different points;

means for slicing and interlacing the at least two frames of images into a merged image; and means for writing the merged image whereby the positioning of a lenticular lens sheet into viewing position of the written merged image permits a sequential viewing of the at least two frames of images in the merged image as a function of a user's viewing angle.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

The method produces a directional shift of an image (or portion thereof) between each section of a sequence or produces images of different pixel content. The process produces a sharper image of text or continuous tone or half tone color gray scale or binary objects to the viewer, creating increased legibility and clarity. Without the utilization of this method, a lenticular image may exhibit severe artifacts and a general lack of definition (i.e. fine detail).

The method renders control over both legibility (defined as ease of reading characters) and clarity (defined as overall image quality and the ability to see smooth edges specifically) of lenticular images and is a direct result of applying a shift or change in control to any individual element or in tandem with any or all other components (imagery, graphics, text, or other).

The method may eliminate the hidden image areas between the lenticules of the lenticular screen upon lamination of the lenticular screen to an image support layer.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
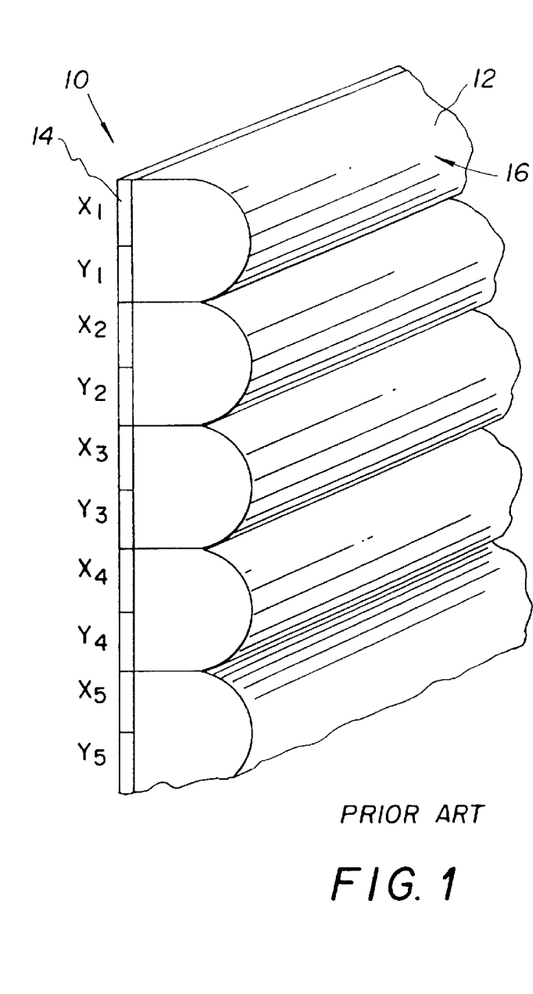
FIG. 1 illustrates a simplified Prior Art structure that incorporates a lenticular sheet and permits the viewing of images by angular displacement of the lenticular sheet relative to a viewer.

Referring to FIG. 1, a simplified Prior Art arrangement of a lenticular image 10 is shown comprised of a support layer 14 on which are formed image slices, denoted generally as X and Y, which are in alignment with respective lenticular lens elements 12 that are part of a lenticular sheet 16. In the Prior Art arrangement the horizontally orientated lenticular image contains only two views, X and Y of an object. The information for view X is placed along the upper half of the image area of each lenticule 12. Likewise, information for view Y is based in the lower half of each lenticule 12. When the object is viewed, view X is displayed to the observer at one viewing angle while view Y is displayed at another angle. In actual practice the number of slices per lenticule of the image containing the object to be viewed ranges from between 2 to more than 30.

A subject displayed in the lenticular image, which would not change in position between X and Y, would display the same information in both views within the image. This would be the case, for example, when an item of text were to be viewed (see, for example. Morton U.S. Pat. No. 5,276,478).

Figure 2:
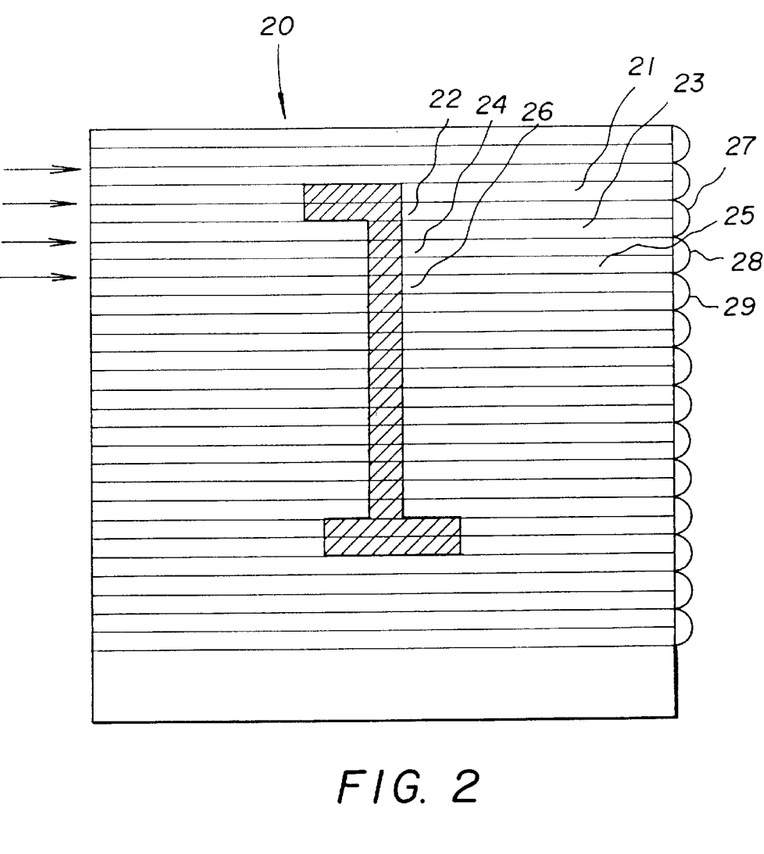
FIG. 2 illustrates the current method of resampling at constant coordinate locations in the image area to form the image slices that are positioned behind each lenticule of the lenticular sheet of FIG. 1.

Referring to FIG. 2, in the present description the complete source image 20 is a number 1 which is meant to be viewed flat with no depth or motion within a lenticular image. Utilizing the teachings of the prior art, the same portion of the number 1 would be repeated under each of the lenticules for the number of slices that would be selected for forming, for example, the motion image. If there are more lines in each image in the sequence than there are lenticules, then in order to print it, the sequence image is subsampled. In FIG. 2 the number 1 is subsampled into 2 frames, and the final image would display segment lines 21, 23, and 25 corresponding to one frame, and 22, 24, and 26 corresponding to the other frame under lenticules 27, 28, and 29, respectively, in both view X and view Y.

In the prior art, finite details are lost due to sectioned subsampling and lenticular alignment. Arrows indicate where the subsampling would take place. Therefore, where the subsampling takes place is where portions of detail would be displayed in the final image and conversely, where the subsampling does not take place details are lost. Likewise, the alignment of the lenticular sheet over the interlaced image produces invisible image areas between the lenticules.

Incorporating a downward shift in the sampling of the numeral 1 (that is resampling starts at one line lower than for the image) for the second view, that is, instead of displaying lines 21, 23, and 25 in both view X and Y, view X would display lines 21, 23, and 25, the view Y would display lines 22, 24, and 26. This results in a subjectively sharper image to the viewer. The shortcomings of the lenticular screen are also avoided when utilizing this technique.

Figure 3A:
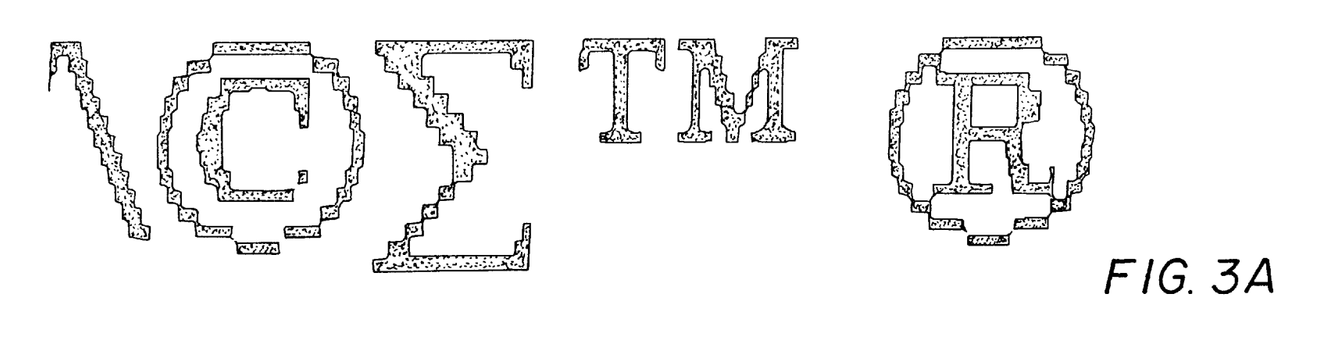
FIG. 3A illustrates the result of current sampling techniques before adhesion or printing to the back surface of a lenticular sheet.
Figure 3B:
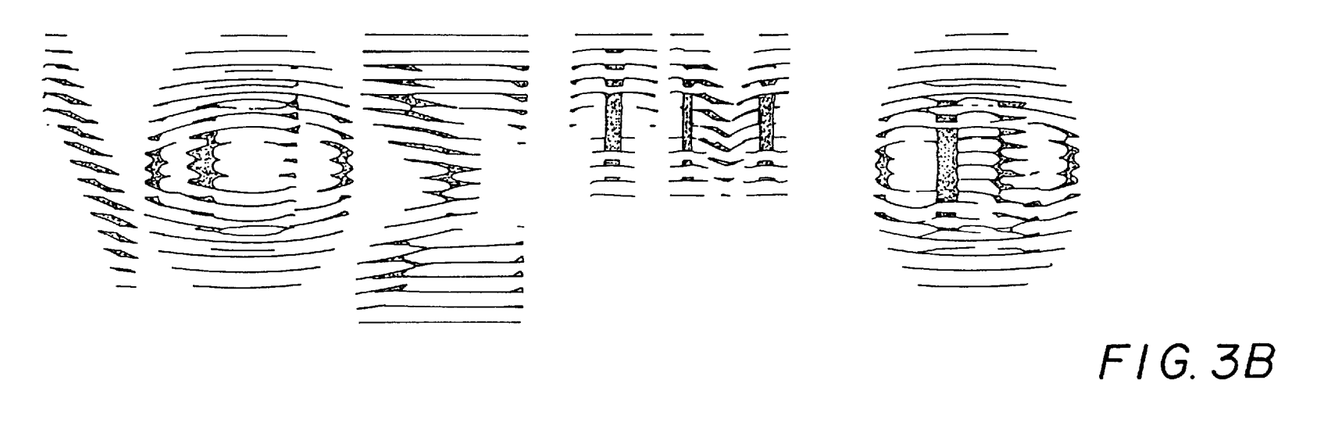
FIG. 3B demonstrates the modified sampling process of the present invention before adhesion or printing to the back surface of a lenticular sheet.

In FIG. 3A the conventional (non-displaced sampling) will display the image as shown, while in FIG. 3B the improved technique, of utilizing, shifting sampling is shown. The methodology of this technique can be appreciated by reference to the single image 30 shown in FIG. 4 and the following: Image 30 comprising an "O" labeled 32 is designed to subtend $N_P$ pixels by $N_L$ lenticules where each lenticule comprises M views. Two adjacent lenticules are labeled 34 and 36 and will be discussed in the improvement description relating to FIG. 5. The arrowed line's 38 and 40 represent sliced profiles of the pixel values that form the letter "O." The lenticules may be horizontal for motion images and alternatively may be vertical for depth images. Other effects may involve the lenticules in a variety of directions.

Figure 4:
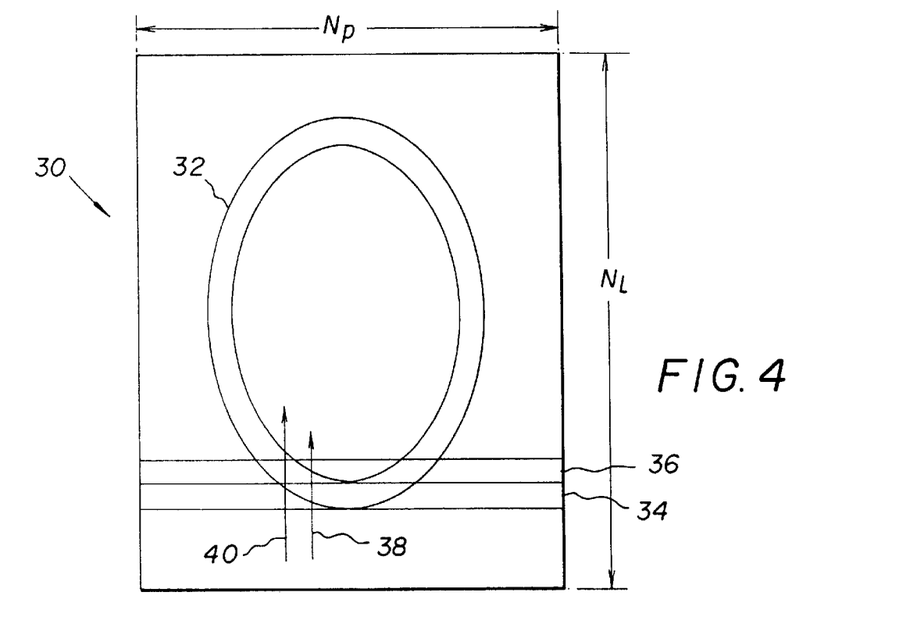
FIG. 4 depicts an image of the letter "O" that is to be incorporated into a lenticular viewing structure.
Figure 5:
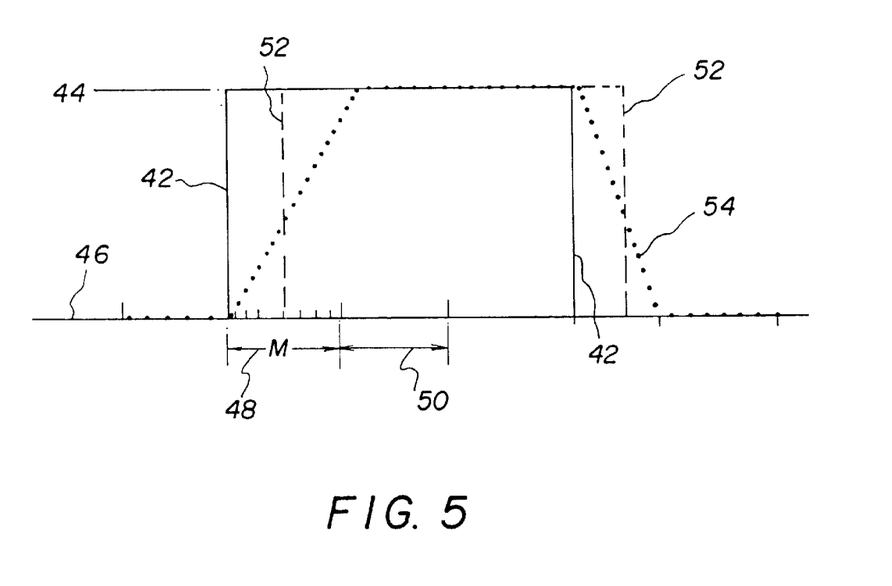
FIG. 5 is a set of intensity profile curves taken from a scanning of the image of the letter "O" of FIG. 4.

FIG. 5 shows one way to represent a portion of the "O" image 32 as an image positioned under the lenticular lens contained in the image 30 in terms of sequential pixel intensity values that exist along the arrowed line 38 shown in FIG. 4. An intensity profile 42, for each of the M pixels under the lenticule 34, takes on pixel intensity values corresponding to the intensity value shown as 44 while the background takes on the pixel intensity value shown as 46. The span or width of the lenticule 34 in FIG. 4) is shown as 48. Similarly the span or width of the lenticule 36 (in FIG. 4) is shown as 50. An alternate way to represent this portion (along 38 of the letter "O") is shown as the dashed intensity profile 52 which shifts the image edge to center it under the intended position of lenticule 34, assuming that the lenticule 34 is correctly aligned with the image so that the pixel values of different frames under lenticule 34 representing the image "O" 32 are different. Another profile along line 38 is shown as the dotted profile 54 which provides smooth gray scale intensity values along the edges of the letter "O". When pixels along path 38 are compared to pixels along path 40 (profiles 52 and 54) they generally have different pixel values for some of the M views under a specific lenticule whereas intensity profile 42 generally has the same pixel values along paths 38 and 40. Furthermore, unless the edge of the object being represented is parallel with the lenticules, transitions between levels 46 and 44 will generally occur at the same point along paths 38 and 40 whereas transitions for profiles 42 and 52 will typically occur at different points along paths 38 and 40. It will be appreciated that profile 42 corresponds to prior art whereas profiles of the type 52 and 54 are formed by this invention. This effect is the result of the processing which will be described later in relation to FIG. 7 in conjunction with FIGS. 6, 8, 9, and 10.

Figure 6:
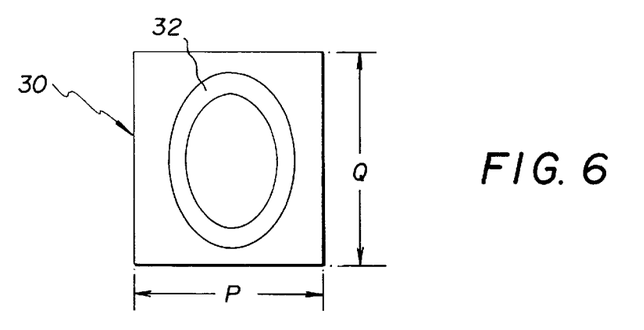
FIG. 6 depicts the image of the letter "O" with P and Q dimensions.

In FIG. 6 the original source image 30 used to generate the image 32 of the "O" is comprised of P pixels by Q lines (or visa versa P lines by Q pixels if the scan lines run vertically on the page). The Image 30 is processed for inclusion as part of a lenticular image using the improvement of the present invention. Data representing the pixel amplitudes of the P pixels are provided as inputs to the processor o f FIG. 7 on line 56. If Q is less than $K*N_L$ where K falls in the range of 3 to 40 then it is necessary to increase the resolution in the Q direction. If the image 36 of the "O" is a binary image such as text, then edge position smoothing may be initially required in order to achieve good image quality. Within the processor of FIG. 7 the smoothing process is performed by edge position smoothing block 58 as shown in greater detail in FIG. 8. The edge 88 corresponds to the edge of the incoming image on line 56 and represents a small region of the image. To smooth this edge involves increasing the resolution of the incoming image to values which are 4 to 40 or more times greater (depending on the number of views or frames over which the image is to subtend) for P and/or Q. This results in the output edge data appearing on line 60 having the smooth profile represented by profile 90 in FIG. 8. This smooth profile avoids the pixelization of aliasing affects of the incoming image which might otherwise appear in the final image. The specific methodology for performing this function are well known and include converting edge 88 into a vector string and then repixelizing the vector string at the desired higher resolution.

Referring back to FIG. 7, it is next desirable to apply edge amplitude smoothing to the output edge data on line 60. The edge amplitude smoothing function 62 of the processor improves the clarity of images, especially binary images, by smoothing the amplitude of the edge of an image to provide the greatest image clarity. This produces a continuous tone image from a binary image by applying a filtering function to the binary data using a convolution kernel so as to produce two dimensional smooth gray scale images. The action is shown typically in FIG. 9 where a binary step edge 92 is transformed to a gradually changing transition in signal intensity value 94. This process can also result in greater pixel amplitude resolution enabling the process to produce different pixel values for successive frames.

Figure 7:
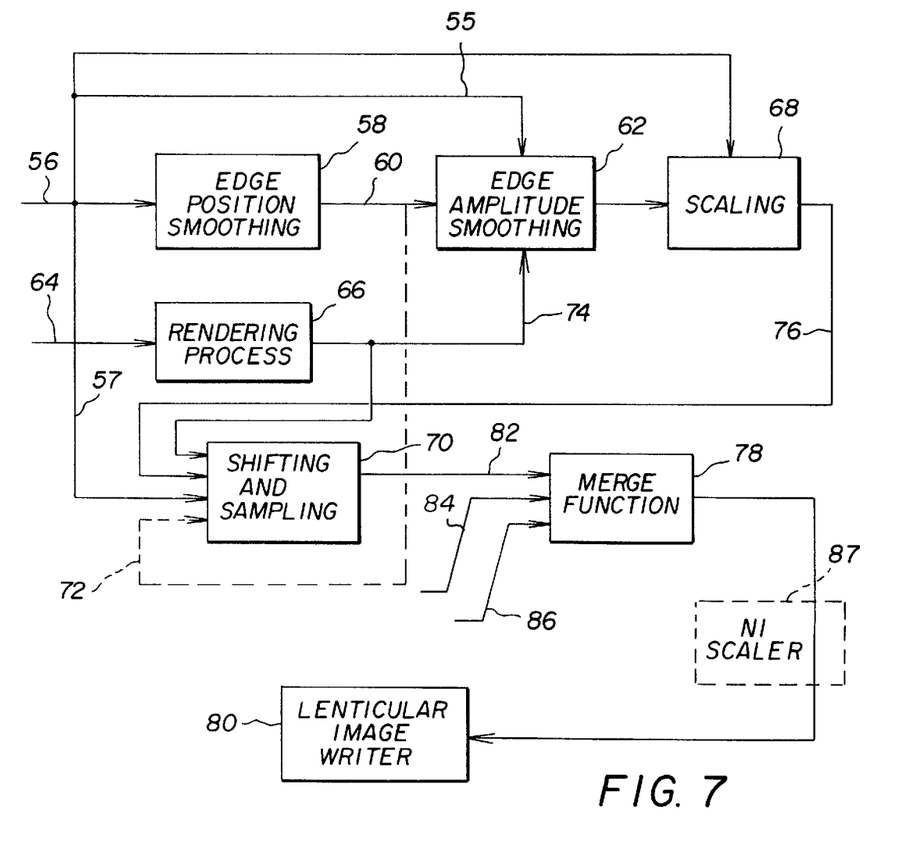
FIG. 7 illustrates in block diagram form a system for receiving digitized imaging data and for driving a lenticular image writer to write the image represented by the imaging data.

If the original source image 30 of FIG. 6 is represented in a non-pixelized format such as Postscript or a vector representation, then the imaging data enters the processor on line 64 of FIG. 7 at the input to the rendering process 66. The rendering process takes the vectors and represents them as pixels at the required resolution as previously discussed.

Figure 8:
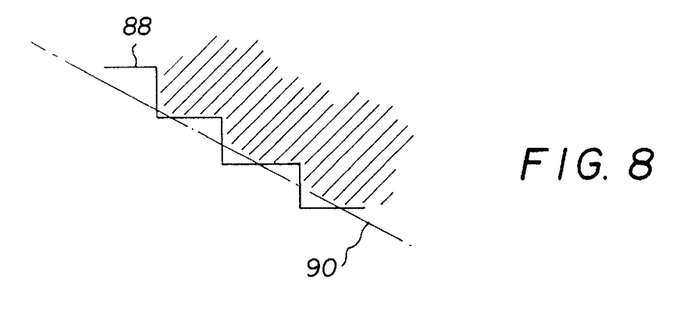
FIG. 8 is a graphic representation of edge sharpening for images of the present invention.
Figure 9:
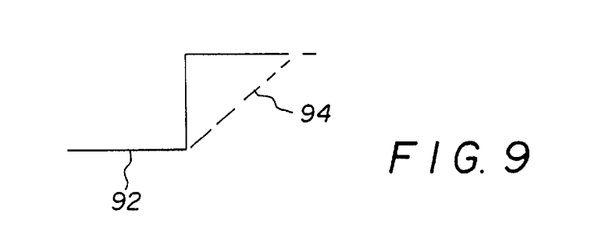
FIG. 9 illustrates an edge pixel transition.

In the case of continuous tone source images, the intensity profile (of which is represented in FIG. 8), representing the image data is entered on line 56 and is processed by the scaling function 68 to increase its resolution so as to have sufficient image content for the subsequent shifting and sampling process 70. This function can also be used for binary or discrete tone level images though not with the effectiveness of functions 58 and 62. Scaling is generally performed using nearest neighbor, linear, or cubic interpolation which are standard image processing sizing techniques, or sizing techniques as might be found in Adobe Photoshop and similar software.

Pixel data on line 60 is generally directed to the edge amplitude smoothing function 62 however, it can also be directed directly to the shifting and sampling function 70 on line 72 if it is only desired to shift and sample binary image data. This path may however result in lower image quality. Also if the data on line 56 has sufficient resolution, it may also be passed directly to the shifting and sampling function 70 on line 57.

The edge amplitude smoothing function 62 may be used to improve the clarity of images, especially binary images, by smoothing the amplitude of the edge of the image. The amount of smoothing that gives the best clarity is a function of M, $N_L$, P, Q, K, and the overall resolution sharpness of the lenticular imaging system. It is often influenced also by the shifting and sampling function 70 and can be best assessed experimentally by changing values to provide the best image.

It should be appreciated that the choice of input 55, 60, or 74 depends on the characteristics of the incoming signal and the desired clarity improving approach which is best determined experimentally. Input line 55 is used when the resolution of the input data on input line 56 is sufficient to satisfy the K criterion mentioned above. Input 60 is used when edge position smoothing is initially required, and input 74 is used when the input signal on line 64 is in vector or postscript format.

The output of function block 62 passes to a scaling function 68 which scales the final image by resampling the image so that the output format on line 76 has $N_P$ pixels across the image in the direction along the lenticules and a resolution. $N_P$ is typically in the range of $K_1*M*N_L$ where $K_1$ is in the range of 0.5 to 16 or even higher. In the preferred embodiment $K_1=8$. One factor in choosing K is so that the shifting and sampling function 70 has sufficient resolution to sample the image at small shifts and then having sampled provide a final image that is passed through a merge function 78 to a lenticular image writer 80 with the desired size in the written image by function 68. In the desired final size each frame typically corresponds to $N_P$ pixels by $N_L$ lenticules corresponding to the size of the region in the final image to be subtended by source image 30.

Figure 15:
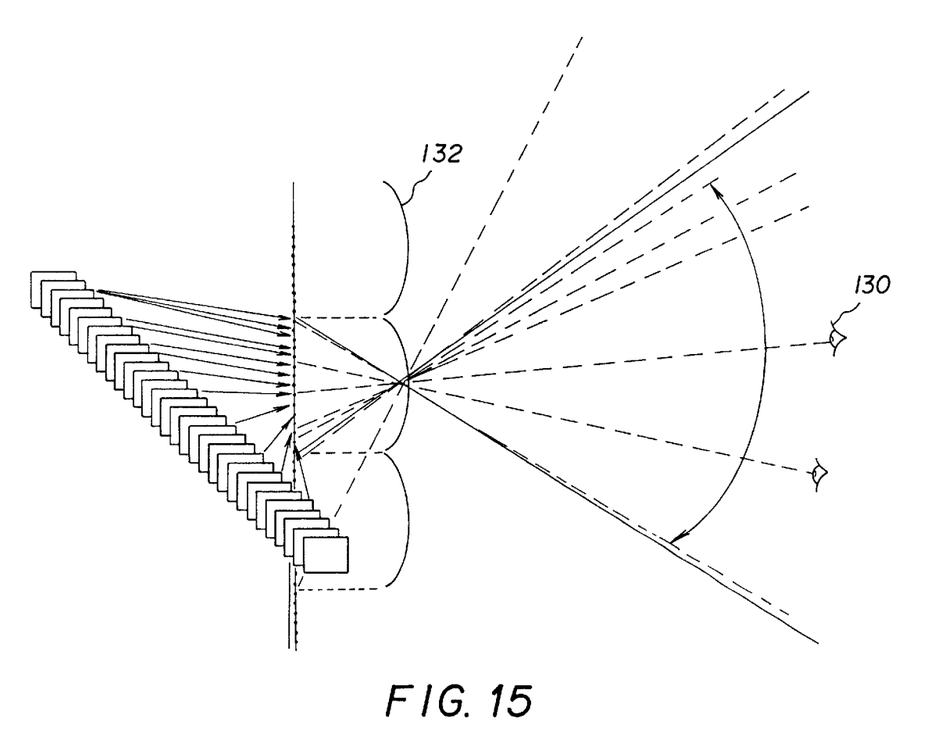
FIG. 15 represents a change in a viewer's viewing angle through a lenticular lens sheet to a sequence of views that have been shifted in accordance with the teachings of the present invention.

Merge function 78 receives M (1 through M) frames on each of lines 82, 84, and 86. The frames on line 82 correspond to the image on line 56 while the views on lines 84 and 86 correspond to other elements of the final image such as areas of text, areas of motion, areas of depth, or other graphics, or image content areas. The merge function 78 first merges using overlay and other image layering techniques to each of the respective views so that all of frame 1 components on lines 82, 84, and 86 are merged into a single frame one. Then all frame 2 components are merged and so on, so as to make M separate frames. Function 78 then interleaves those frames into M interleaved slices under each lenticule as shown in FIGS. 1 and 15 (in FIG. 1, x corresponds to frame 1 and y corresponds to frame 2). Thus, other interleaved images on lines 84, 86, etc. may correspond to digital data representing other components of the final lenticular image. These may include, for example, data generated from distinctly different views in either space or time of the same scene or may correspond to merge data from different scenes.

Thus, this merging process generally involves setting the relationship with other merged data such that some components are assigned specific views, other components are assigned specific positions in the final image and others are assigned specific layers of the image.

Whatever the source, most often the other components to be merged are interleaved in such a way that they correspond to the image required to represent different views behind each lenticule as demonstrated in FIG. 1 and also in U.S. Pat. No. 5,276,478. Notice in this prior art process multiple different images from the same scene are generally involved whereas in the current process multiple and different frames, which may appear to be the same views, under a given lenticule are derived from the same view or image.

Figure 10:
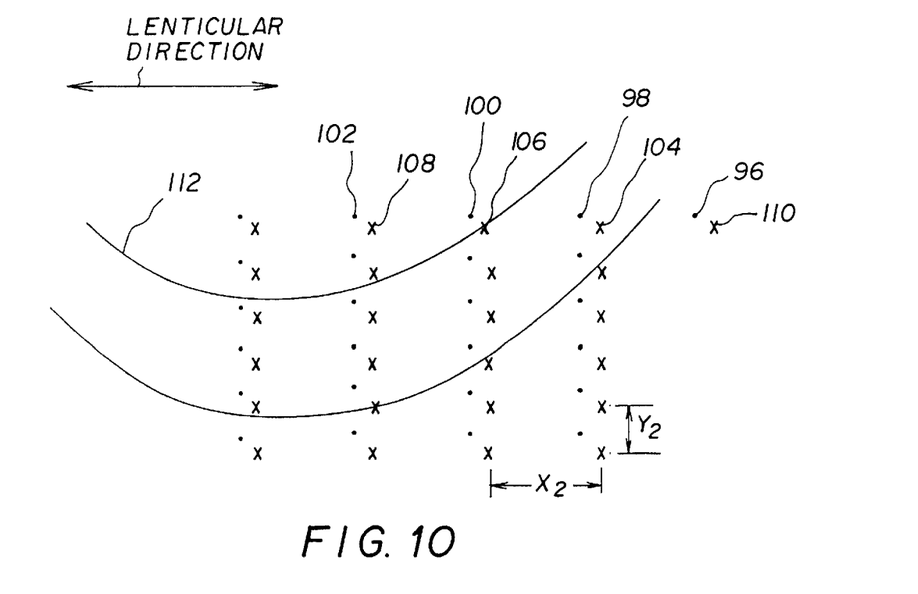
FIG. 10 illustrates the shifting of a sampling grid in accordance with the present invention.
Figure 11:
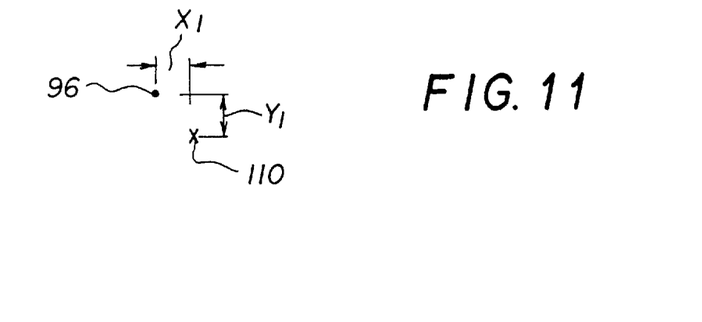
FIG. 11 illustrates the shifting of a sampling position between views.

The goal of the shifting and sampling process 70 is to sample the high resolution image in a grid which is oriented in both the direction at right angles to the lenticules and normal to the lenticules as shown in FIG. 10. In FIG. 10, the grid has a pitch $X_2$ in the x direction and $Y_2$ in the y. The sampling grid is shifted by $X_1$ in the x direction and $Y_1$ in the y direction between the sampling process for each of the lenticule views. This shift may be in one or both directions (usually the y direction) and may be constant, variable, or random between consecutive views. The shifting occurs so as to provide an increase of image quality and the best pattern is arrived at by testing at various amounts of shift to satisfy a viewer's preference. This shift is also a function of lenticule pitch, viewing distance, the intrinsic overall resolution of the image on line 76, and the detail desired to be reproduced. Points 96 to 102 and similar points represent a first sampling position for a first view or frame. Points 104 to 110 and similar points represent a second sampling position for a second view or frame. The sampled image 112 may be a black and white or color discrete level image or may be a black and white or color continuous tone image. Often it is advantageous in the case of text images, for example, to make the image continuous tone by filtering it with a continuous tone filtering function FIG. 11 illustrates the shift between the same sampling points between the sampling for one frame and then for another frame so that the sampling occurs at different positions. Where an identical position is used on different frames that identical position is said to constitute one view, and two frames are said to have the same view. In fact, however, it may appear that even when the frames are different (that is having different value pixels), they may continue to appear to comprise a single view. Thus, for example, in a lenticular image having 24 frames, these 24 frames may appear as 3 views occupying the entire image area and each view comprising a different scene and each scene spanning 8 frames. However, each of the 24 frames may be different in detail (that is to say having different pixel values) and these 8 different frames corresponding to one scene may each be produced as described in this invention thereby 3 scenes producing 3 scenes each of 8 frames with higher image quality.

Figure 12:
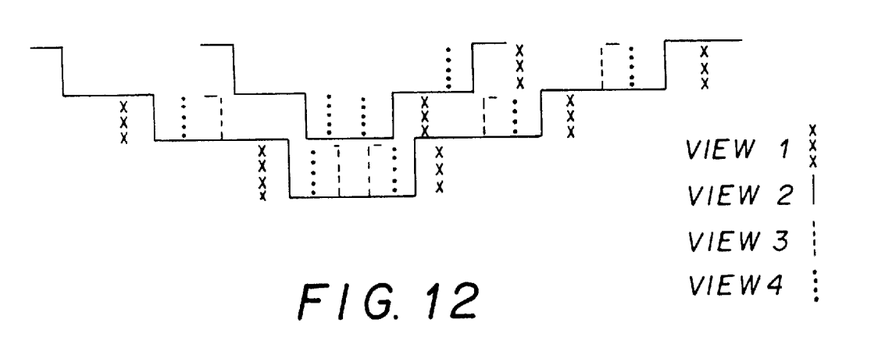
FIG. 12 is a set of keyed graphs 1–4 representing the intensity values of, for example, the letter "O" at different lenticular viewing angles incorporating the teachings of the present invention.

Furthermore when examining differences between frames by overlaying consecutive views, FIG. 12 shows a sample resulting from the shifting and sampling process 70. It should be appreciated that the views or frames shown in FIG. 12 may also be shifted in relationship to each other due to the shifting action of 70.

Figure 13:
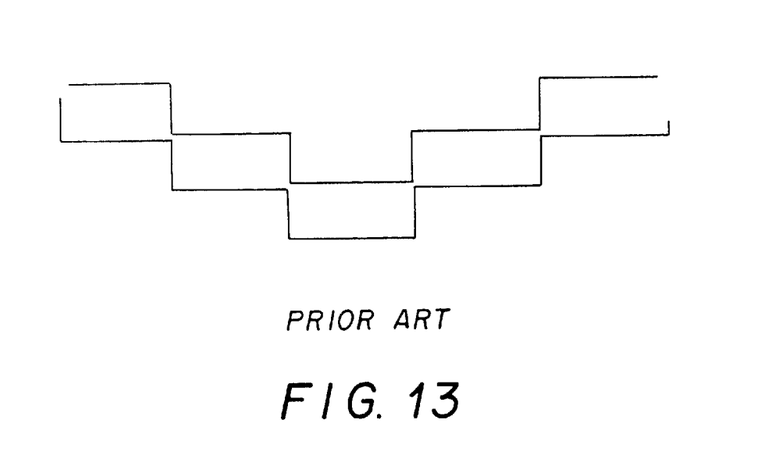
FIG. 13 is a set of graphs representing the intensity values of the letter "O" using PRIOR ART.

FIG. 13 represents the prior art approach where shifting of the sampling points between views or frames does not take place.

Referring back to FIG. 7, it has already been pointed out that a resolution of K times the lenticule pitch is required on line 76 where K is many times the lenticule pitch so as to have sufficient resolution in the image to be sampled as to have sampled viewers which accurately represent the image when sampled at a specific position. The shifting and sampling process 70 generally must produce the interlaced image slices positioned behind the lenticules which has M pixels across each lenticule thus having a resolution or right angles to the lenticule of $M*N_L$. The term "generally" is used because it is also possible to create lenticular images where the number of views or frames does not correspond to the number of pixels or lines at right angles to the lenticule because the number of pixels or lines laid down by the printer does not match in an exact or integer manner to the lenticular material and as a result the image is scaled in the dotted line function, non-integer scan line scaler 87. In this case the goal of the scaling is simply to ensure that M views span the lenticules (see U.S. Pat. No. 5,276,478 by Morton). This scaling, when applied, can also occur before merging provided all the imaging components are appropriately scaled to match the final desired size.

Figure 14:
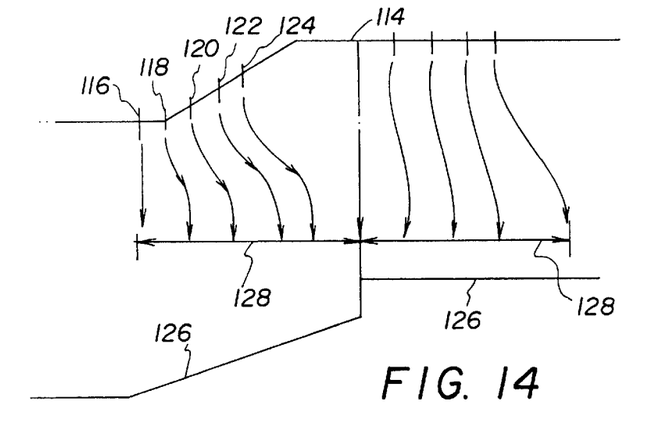
FIG. 14 are position graphs illustrating the position of pixel elements with respect to adjacent lenticules.

The effect of shifting and sampling can also be achieved as shown in FIG. 14 by taking input image data 114 representing amplitude data and generating a new image signal by sampling the amplitude of incoming data 114 at predetermined points and using the data to mike a signal of M pixels across each lenticule whose amplitude corresponds to the amplitude of the incoming signal at the predetermined input points. Depicted is a sampling for M=5 along a single direction where the sampling points are closer than the distance represented by the spacing of one lenticule. The input signal 114 is sampled at points 116 to 124 and regenerates a signal 126 where there are 5 equi-spaced samples across distance 128 corresponding to one lenticule. Note that because the, sample spacings are not necessarily equi-spaced the resulting signal can be discontinuous.

Again referring back to FIG. 7, lenticular image writer 80 next writes the image slices corresponding to, for example, image 20 or 32, onto the image layer. The image writer may be capable of writing either continuous tone, half tone, or binary images. Generally speaking, if the output resolution of the image is $N_P$ pixels by $N_L$ lenticules where (each lenticule comprises M views then the image on line 82 must be $N_P$ pixels by $N_L*M$. This also means there must be $N_P$ pixels across the image generated by the scaling function 68 and passing down line 76 or along line 84 depending upon which input has been chosen which in turn is dependent on whether the input is vector or pixel based.

Another alternative to uniformly shifting the image in the direction of right angles to the lenticules is to shift the image in random steps at right angles to the lenticules, each step being either in the same direction of random amplitude or some steps being forward and other steps being in reverse. The advantage of this approach is that there is no net motion, but the various frames contain, in the same manner as already described, a high resolution image which is correct for that particular sub-lenticule position or for that particular position with respect to the lenticule.

The random motion of text can be achieved either while moving the apparent position of the text in a constant velocity or keeping the apparent position substantially stationary. The latter can be achieved by having random motion where the sum of the motions over the full range of views is zero. Moving the apparent position can be achieved by providing random motion and introducing a drift associated with the random motion, that is, the sum of the individual motions is still moving in a constant direction. It will also be appreciated that the random motion may be exclusively at right angles to the lenticules or may have a component which is parallel to the lenticular direction.

Another embodiment of the invention is to compensate for the loss of intensity in areas containing fine text due its narrow width. This problem arises because when fine text which has thin strokes or a narrow structure, as seen through the lenticules, does not have the same contrast as course text of thick strokes or a wide structure. To compensate for this, the intensity or contrast of the fine text can be increased so that the resulting impact is that thin text and thick text have the same apparent intensity. If the full available dynamic range of intensity is used for the thin text, then it is advantageous to reduce the intensity or contrast of the coarse text. In other words, if the intensity or contrast of the thin text has reached its maximum limit of dynamic range for driving the printing device, then to compensate the intensity of the coarser text is reduced so that the overall appearance is matched.

In FIG. 15 as the viewer 130 passes across the front of the lenticular image 132, what he sees will correspond to the overlaid sequence of views or frames corresponding to that represented by the set of graphs in FIG. 12. FIG. 12 corresponds to the overlaid sequence of views or frames, the lenticules by the viewer, across in front of the lenticular image 132.

Use of the invention is advantageous for both continuous tone images, text, and graphic elements.

It will also be appreciated for all the above that while this description has sometimes focused primarily on motion at right angles to the long axis of the lenticular lens element that motion can also be provided in directions which have a component along the lenticules long axis.

The invention has been described with reference to a preferred embodiment; However, it will be appreciated that variations and modifications can be effected by a person of ordinary skill in the art without departing from the scope of the invention.

PARTS LIST:

| | |
|---|---|
| 10 | lenticular image |
| 12 | lenticular lens elements |
| 14 | support layer |
| 16 | lenticular sheet |
| 20 | complete source image |
| 21 | segment line |
| 22 | segment line |
| 23 | segment line |
| 24 | segment line |
| 25 | segment line |
| 26 | segment line |
| 27 | lenticule |
| 28 | lenticule |
| 29 | lenticule |
| 30 | single image (original source image) |
| 32 | letter "O" |
| 34 | lenticule |
| 36 | lenticule |
| 38 | arrowed line (sliced profile) |
| 40 | arrowed line (sliced profile) |
| 42 | intensity profile |
| 44 | intensity value |
| 46 | intensity value |
| 48 | span/width of lenticule 34 |
| 50 | span/width of lenticule 36 |
| 52 | alternate intensity profile |
| 54 | alternate intensity profile |
| 55 | input |
| 56 | line |
| 57 | line |
| 58 | edge position smoothing block |
| 60 | line (input) |
| 62 | edge amplitude smoothing function |
| 64 | line |
| 66 | rendering process |
| 68 | scaling function |
| 70 | shifting and sampling process |
| 72 | line |
| 74 | input |
| 76 | line |
| 78 | merge function |
| 80 | lenticular image writer |
| 82 | line |
| 84 | line |
| 86 | line |
| 87 | non-integer scan line scaler |
| 88 | edge |
| 90 | profile |
| 92 | edge |
| 94 | signal intensity value |
| 96 | point |
| 98 | point |

-continued

PARTS LIST:

| | |
|---|---|
| 100 | point |
| 102 | point |
| 104 | point |
| 106 | point |
| 108 | point |
| 110 | point |
| 112 | sampled image |
| 114 | input image data |
| 116 | sample point |
| 118 | sample point |
| 120 | sample point |
| 122 | sample point |
| 124 | sample point |
| 126 | signal |
| 128 | distance |
| 130 | viewer |
| 132 | lenticular image |

What is claimed is:

1. A method for forming a lenticular image having viewable depth or motion effects, comprising the steps of:
   providing a lenticule sheet having a plurality of lenticules trrayed in a given direction,
   interlacing at least two frames of the same image with at least one frame sequentially displaced perpendicular to said given direction; and
   positioning said lenticule sheet of so as to view the image content of the interlaced frames of the same image.

2. A method according to claim 1, wherein the at least two frames of similar image content are derived is digitally and where each frame is derived by sampling the single image at a different sampling position sequentially displaced perpendicular to the lenticular direction by at least one pixel and recorded onto a support base in interleaved slices with the sheet of lenticular material attached to the image base with each lenticule in registration with corresponding interleaved slices.

3. The method according to claim 2 wherein each frame is displaced perpendicular to the lenticular direction by at least one pixel and recorded onto a support base in interleaved slices; and
   said sheet of lenticular material is attached to an image base with each lenticule in registration with corresponding slices.

4. A method for forming a lenticular card having viewable depth or motion images, comprising the steps of:
   a) obtaining at least two frames of the same image;
   b) displacing each frame perpendicular to a lenticular direction and recording onto a support base in interleaved slices; and
   c) laminating a sheet of lenticular material having a plurality of elongated lens elements the length of each defining the lenticular direction to said support base with each lenticule in registration with corresponding slices.

5. An imaging method comprising the steps of:
   a) processing an image of a subject into a plurality of images by sampling at different positions;
   b) merging the plurality of sampled images to provide merged interlaced images; and
   c) positioning the merged images with respect to a sheet of lenticular lenses in a viewing position to permit viewing of the plurality of images.

6. The imaging method according to claim 5 and further comprising the steps of:

prior to processing an image, digitizing the images into pixels and displacing the sample points of at least one of the plurality of images of step a) by at least one pixel.

7. The imaging method according to claim 5 and further comprising the steps of:

displacing at least two of the plurality of images in a direction perpendicular to the directions that the images are sliced.

8. A card supporting interlaced images for viewing through a lenticular sheet manufactured in accordance with the method steps of claim 5.

9. A method for forming an image comprising the steps of:

a) forming multiple frames of image data by repeatably sampling an original image with at least one of the samplings being displaced in position from a preceding sampling;

b) interleaving the samples from each of the multiple frames; and c) positioning the interleaved multiple frames with respect to a lenticular sheet having a plurality of lenticular lenses into viewing alignment.

10. A method for forming an image according to claim 9 wherein the samplings of the original image are displaced perpendicular to the line of interleaving used t6 join the samples from each of the multiple frames of sliced image data.

11. A method for forming an image according to claim 10 and further comprising the steps of:

a) sampling a plurality of original images;

b) interleaving the samples from all of the sampled original images to form a merged interleaved image.

12. A method for forming an image according to claim 11 and further comprising the step of printing the merged interleaved image onto a supporting media for viewing.

* * * * *